April 21, 1931. C. B. TOWNSEND 1,801,466
ELECTRICAL METHOD OF AND MEANS FOR OBSERVING OBJECTS IN MOTION
Filed April 3, 1929 3 Sheets-Sheet 1
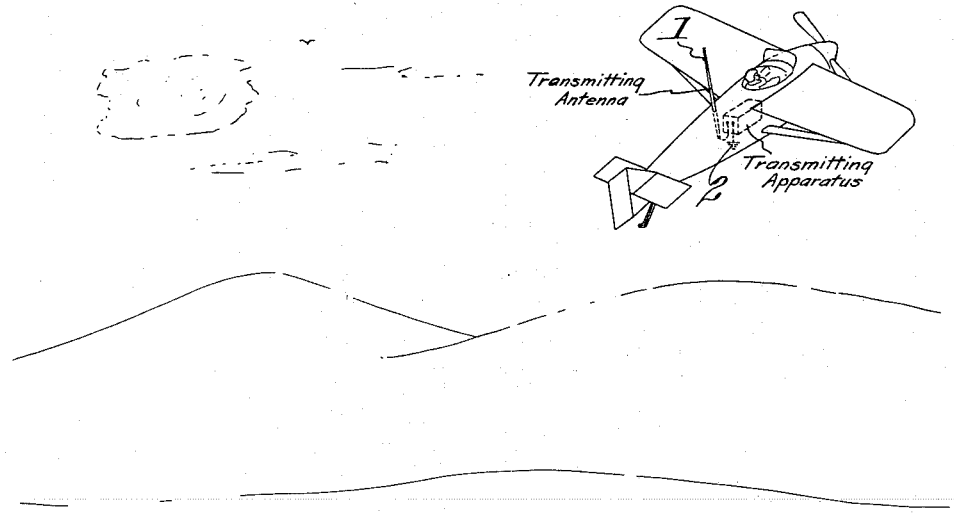
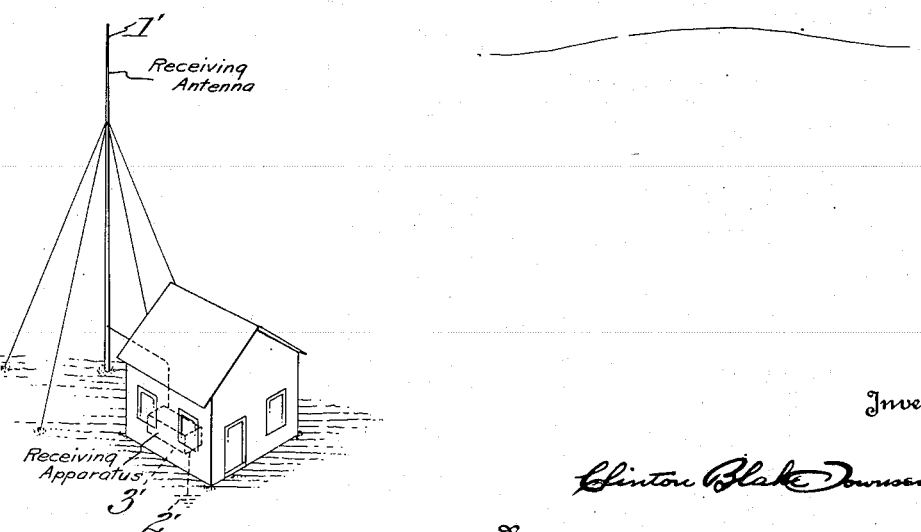

April 21, 1931.  C. B. TOWNSEND  1,801,466
ELECTRICAL METHOD OF AND MEANS FOR OBSERVING OBJECTS IN MOTION
Filed April 3, 1929   3 Sheets-Sheet 2
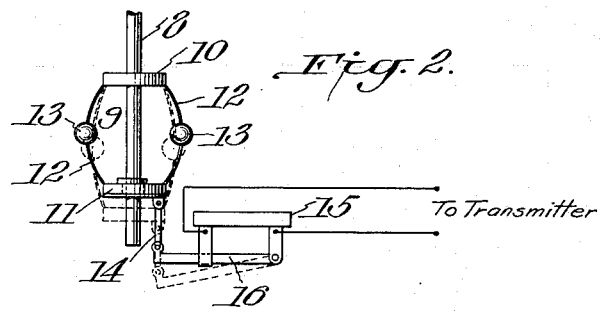
Fig. 2.
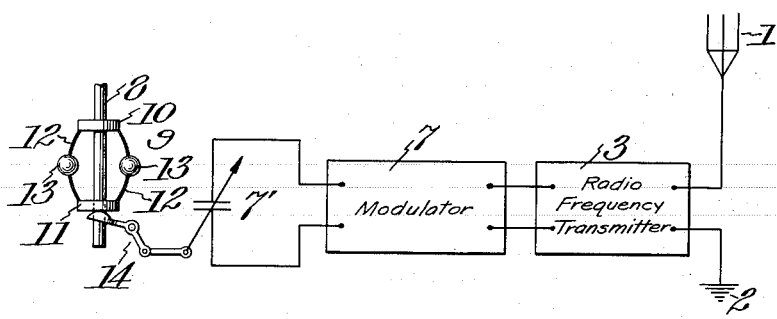
Fig. 3.
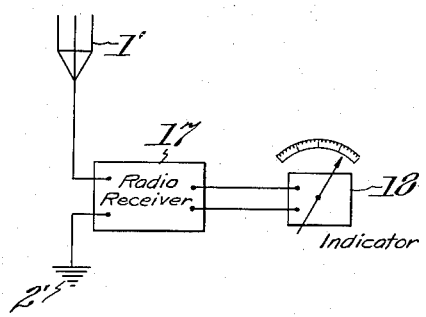
Inventor:
Clinton Blake Townsend,
By Byrnes Townsend & Brickenstein,
Attorneys.

April 21, 1931.  C. B. TOWNSEND  1,801,466
ELECTRICAL METHOD OF AND MEANS FOR OBSERVING OBJECTS IN MOTION
Filed April 3, 1929   3 Sheets-Sheet 3
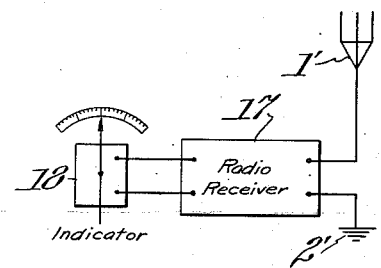
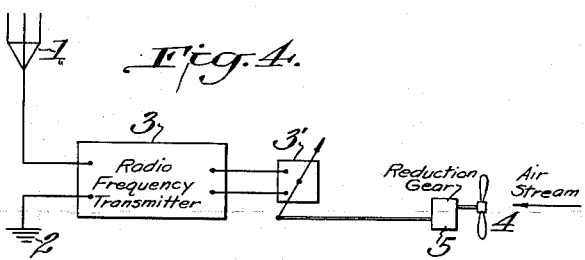
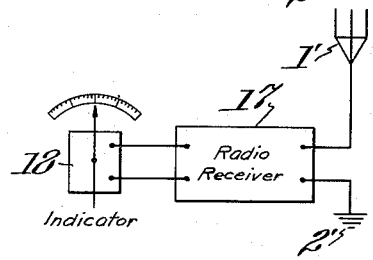
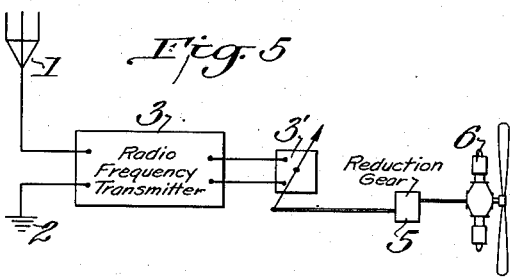
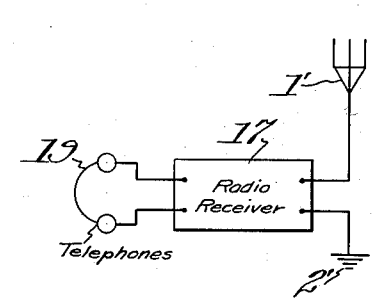
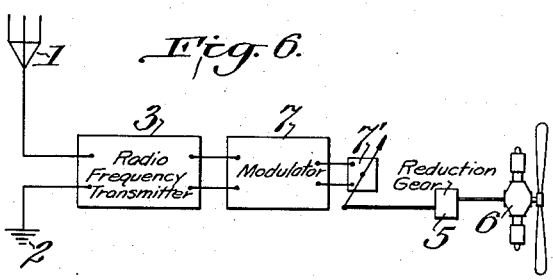
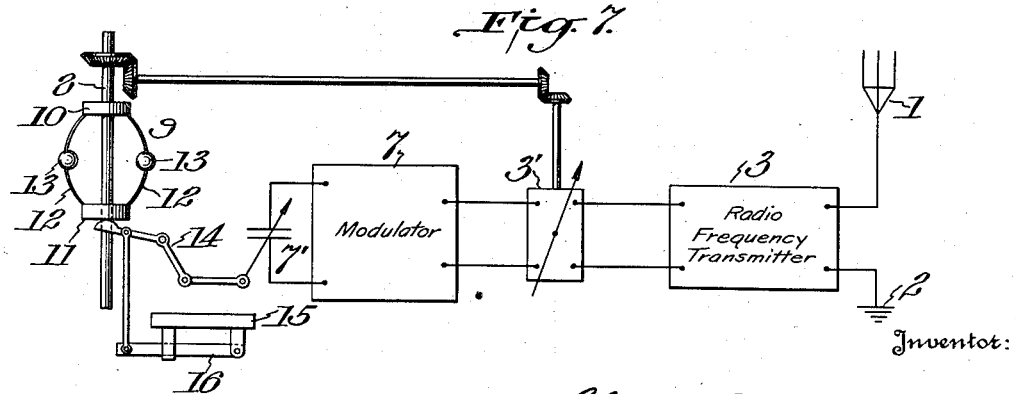
Inventor:
Clinton Blake Townsend,
By Byrnes, Townsend & Brickenstein,
Attorneys.

Patented Apr. 21, 1931

1,801,466

UNITED STATES PATENT OFFICE

CLINTON BLAKE TOWNSEND, OF NEW YORK, N. Y.

ELECTRICAL METHOD OF AND MEANS FOR OBSERVING OBJECTS IN MOTION

Application filed April 3, 1929. Serial No. 352,259.

This invention relates to an electrical method and apparatus for determining various relations between a moving object and an observation station. It is applicable, for example, to the determination of certain relations between aircraft while in flight and a point or observing station on the earth's surface. It is also applicable to the determination of these relations with regard to other moving objects, but, in general, the problem of communicating with aircraft is more difficult, and is therefore the most useful application of the invention. The invention will therefore hereafter be more particularly described in connection with its application to aircraft.

There have been many instances in which an aircraft, whether an airplane, a dirigible, or a free balloon, has begun a flight and its subsequent location and condition has been thereafter completely unknown for a long period. Recent examples of this are furnished by the many airplanes which have undertaken transoceanic flights. In several cases these planes have never been heard of again, and there has been no method of determining how far they flew, how long they remained in the air, or at what rate they traveled. Accordingly, attempts to rescue the occupants were almost uniformly futile in such cases, since it was not even known in what part of the ocean to search. Even in the case of overland flights, for example in the air mail, it is extremely desirable for observers on land to be able to keep track of aircraft in flight. In fog, or stormy weather, or at night, for instance, the pilot may often lose his bearings and wish to be informed from land of his position. Recently several airplanes have been lost during the course of overland flights, and several days have elapsed before the fallen plane could be located, since the search had to be conducted over a very wide area.

The foregoing are merely illustrations of the many needs for a means of determining the relation between aircraft in flight and a point or points on the earth, for example, the length of time the aircraft remains in flight, the distance which it travels, the rate at which it is travelling, and so forth. The present invention affords a means for determining these factors, and comprises broadly the controlled transmission of radio signals from a moving object, such as an aircraft, and the reception of these signals at a suitable observation point or station, such as a receiving station on the ground; the signals thus transmitted from the moving object being controlled or varied in such a manner as to indicate, at the receiving station, certain relations between the moving object and the receiving station, for example, whether or not the object from which they are transmitted is still in motion, its instantaneous rate of motion, and/or the distance which it has traveled, or any one of these factors alone. The present invention relates, also, to apparatus for accomplishing this result, and particularly to apparatus which may be regarded, in one of its aspects, as in the nature of a radio-signal actuated speedometer and/or odometer, which is operated by an aircraft in flight and may be read from a distance, for example, from a point on the ground.

The invention will now be described in connection with the accompanying drawings, in which Figure 1 is a diagrammatic illustration which will be used in explaining the present invention, and Figures 2-7 inclusive are schematic or block diagrams illustrative of certain principles of the invention and apparatus embodying the same.

Referring now to Figure 1, an airplane in flight is illustrated as being provided with a suitable form of radio transmission system, including, in one embodiment, a rigid vertical antenna, 1, composed of a metal tube or rod, for example, of duralumin, and mounted in the fuselage as shown, and a radio transmitting apparatus indicated by the dotted lines, and grounded to the airplane at 2. Trailing-wire antennae, or other non-rigid forms, may, of course, be employed alternatively if desired, but in general have the disadvantage that they tend to introduce wavelength variation, due to changing inductance, and so forth. A receiving station on the earth's surface is also illustrated, as shown by the legends, and includes a receiving antenna 1', ground 2' and suitable receiving apparatus 3'. Radio signals may be transmitted from the aircraft and received at the observing station, and these signals are so controlled, in accord with the present invention, as to indicate at the receiving station certain conditions of the aircraft's flight which it is desired to ascertain. An advantage of this arrangement over mere radio telephone communication from the aircraft is that the transmission may be made automatic if desired, and does not, therefore, require a special radio operator on the aircraft, as has hitherto been the case. Such automatic transmission may also be more certain and more efficient than radio telephone communication, and may be employed, for instance, in the case of a plane whose sole occupant is a pilot, or may be employed as a supplement to radio telephone communication. Automatic transmission of call letters has heretofore been employed in certain cases, but, so far as I am aware, no attempt has ever been made to indicate by such transmission any conditions of the flight of the airplane.

Figure 2 illustrates in a schematic manner one suitable means for indicating to an observing station whether or not an aircraft equipped therewith is, or is continuing, in motion. A shaft 8 is driven in accord with the motion of the aircraft, either directly from the motor, or from a small separate propeller in the air stream. This shaft is provided with a centrifugal or governor-like device 9, which may, for example, include a fixed collar 10 and a sliding collar 11 mounted on the shaft 8. The two collars 10 and 11 are linked by flexible members 12 and weights 13, as in an ordinary speed governor. The movable collar 11 is arranged to actuate, by any suitable linkage, shown schematically at 14, the contact arm 16 of a switch 15. This switch is connected so as to operate a radio transmitter, either directly or through a relay system. The arrangement may be either such that the transmitter is maintained in operation while the aircraft is in flight, thus showing its continued motion, or such that the transmitter is put in operation if the aircraft motion ceases, the transmitter thus serving as a warning device. A suitable arrangement is to employ an automatic transmitter of one of the known types, transmitting at predetermined or stated intervals, for short periods, while the aircraft is in flight. The time of transmission, and intervals, may of course be so arranged as to be characteristic of the particular plane of which the motion is being observed. If one or more of these transmission periods are missed, the observation station can thus ascertain that something is wrong, and act accordingly.

Figure 3 illustrates diagrammatically an arrangement for determining the instantaneous speed of an aircraft upon which it is installed. As before, 8 represents a shaft which may be either associated with the airplane motor or may be driven separately by means of an air-stream propeller. Operated from shaft 8 is a centrifugal or governor device 9 which varies according to the speed of rotation of the shaft 8. This governor device is linked through any suitable mechanism to a variable electrical tuning unit 7'. A linking means is illustrated diagrammatically in Figure 3 as comprising a fixed collar 10 which is mounted on the shaft 8 and a sliding collar 11 mounted on the shaft 8, the two being connected by flexible members 12 carrying weights 13 as in an ordinary governor. The collar 11 then slides longitudinally on the shaft 8 in accord with the speed of the rotation of the shaft and this longitudinal motion of the collar 11 actuates the variable tuning unit 7' through the linkage 14. The tuning unit 7' is associated with a suitable radio circuit arranged to be controlled thereby. In the specific arrangement of Figure 3, 7' assumes the form of a variable condenser, and is associated with a modulator 7, for example of the vacuum tube type, which is arranged so as to modulate a radio frequency transmitter 3, associated with the antenna 1 and ground 2. The elements 7', 7 and 3 may, of course, be arranged or combined in a single radio transmission system. In this arrangement, the tuning of the modulator circuit is directly dependent upon the instantaneous speed of the shaft 8, operated in accord with the motion of the aircraft. The modulation may be at audio frequency, so that by merely listening to the pitch an observer at the receiving station is able to determine the aircraft speed. Alternatively, a visual indication of the modulation frequency may be furnished by a graduated series of vibrating reeds each responsive to a different frequency, similar to those employed for radio beacon indicators or otherwise.

A radio receiver 17 and visual indicator 18 are shown schematically in Fig. 3, associated with the receiving antenna 1' and ground 2'.

According to an alternative arrangement, the tuning unit 7' may directly control the radio frequency transmitter, varying the transmission frequency thereof; the indications at the receiving station thus occuring at raido frequencies. This arrangement may be regarded essentially as an integrating device which acts to integrate the product of the velocity by the time to give a frequency which is proportional to the distance. In the form illustrated, it is subject to the limitation that only the air distance, rather than the land distance is thus integrated, and the error so introduced must be corrected by any of the suitable methods employed in navigation. Examples of arrangements such as that just described are shown in Figures 4 and 5.

In Figure 4, 1 and 2 respresent respectively the antenna and ground of the transmitting system. Connected to the antenna and ground terminals is a radio frequency generator or transmitter circuit 3 which may comprise any suitable transmitter circuit which is sufficiently light and compact for use in aircraft. Aircraft transmitters of this type are now commercially available in various forms. Associated with this radio frequency generator is a variable tuning impedance 3' which may be either a variable condenser or a variable inductance for tuning the radio frequency generator 3, and is in practice ordinarily embodied therein. This tuning element 3' may be varied in various ways in accord with the factor or quantity which it is desired to indicate, in order to produce the controlled radio transmission according to the invention. As shown in Figure 4, the tuning element 3' may be progressively and continuously varied by means of the small propeller 4 driven from the airstream of the plane. In order to prevent too rapid variation of the tuning element 3' a reduction device, worm gear or the like, 5, is suitably interposed between the actuating propeller 4 and the tuning unit.

The operation of the device is as follows: When the aircraft containing the transmitter begins a flight the tuning unit 3' is adjusted for a given frequency, for example either the upper or lower limit of the frequency range assigned for aircraft use or which it is desired to employ for the purpose. The tuning unit is then mechanically connected to the driving mechanism including the propeller 4 and reduction gear 5. As the aircraft upon which the transmitter is mounted proceeds with its flight the revolution of the propeller 4 produces a continuous and progressive variation of the tuning unit 3', thereby progressively changing the frequency of transmission of the transmitter. Thus the transmission frequency is varied continuously in accord with the distance which the aircraft has travelled. An observing or receiving station on the ground need only tune in to the signals transmitted from the aircraft and determine from its tuning control setting, or in other well known ways, as with a wave-meter, the frequency of these received signals, in order to determine the distance which the aircraft has travelled since the transmission was begun. Since the lapse of time can also be observed, the rate of flight can be determined. Moreover, the fact that the aircraft is still in motion can also be determined by the observing station by this means as well as by the other arrangements described for the purpose.

It will be understood that the transmission from the aircraft need not be continuous, since the transmitter may, for example, be of the automatic type which transmits at predetermined intervals. The observing station then tunes in during the transmission periods. Suppose, for example, the transmitter is arranged so as to transmit signals during a five minute period out of every thirty minutes. The observing station then listens at the known proper times, and observes the frequency at which the signal is received, thus reading off the distance. A suitable arrangement is to have the direction of motion of the tuning unit reverse at intervals of either distance or time. In the above example, the tuning may be such that transmission at one period is at the upper frequency limit of the frequency range assigned to aircraft use or which it is desired to employ, and at the next period is at the lower frequency limit; or the tuning direction may reverse, say, every 100 miles, so that, for example, when the plane has travelled an even number of hundreds it is received at one end of the range, and when it has travelled an odd number of hundreds, it is received at the other end of the frequency range. The radio receiver 17 and indicator 18, associated with the receiving antenna 1' and ground 2', at the observation station are schematically illustrated at the left, as shown by the legends.

An alternative arrangement is diagrammatically illustrated in Figure 5, the difference being that in this case the variable tuning unit 3' is operated directly from the motor 6 instead of from a separate propeller operated by the air-stream. The efficiency of such an arrangement is in general somewhat higher, and it has the advantage that the observing station on the ground (shown at the left) is enabled to determine directly whether the motor is still running, and if so, at what rate. Such arrangements in which an integrating effect is produced by control of the carrier frequency or wave length have certain advantages, including simplicity of apparatus, with consequently increased reliability, directness of control, and directness of indication, since it is only necessary to tune the receiving station so as to pick up the carrier wave in order to make the desired observation.

Figure 6 shows an arrangement in which the radio frequency generator 3 transmits at a fixed or constant frequency and is modulated by a modulator 7, the modulation frequency being varied by means of the tuning element 7', associated with the modulator in a manner similar to that shown in Figure 3. This tuning element may be varied in accord with the distance travelled by the aircraft, as in Figures 4 and 5. An advantage of this arrangement is that the observing station need not tune to different frequencies, but can always receive on the same frequency, and can determine the distance which the aircraft has travelled by observing the modulation frequency in any suitable manner, for example by determining the pitch if the modulation is at audio frequencies. At the left is shown a radio receiver associated with a pair of telephones 19 or other aural indicating device suitable for determining the pitch.

Figure 7 is a block diagram of an arrangemen or combination including all of the above radio transmission controls. In this arrangement, the transmission takes place only when the aircraft is in flight. The governor 9 and switch 15 are suitably proportioned so as to keep the transmitter in operation only when the shaft 8 is rotated at a speed sufficient to correspond to a flying speed of the aircraft, for example. The instantaneous speed is indicated by the modulation frequency, by means of variable tuning unit 7' and modulator 7, the unit 7' being varied according to the instantaneous speed. The total distance travelled is indicated by the adjustment of the variable tuning unit 3' which controls the frequency of the radio frequency transmitter 3 associated with antenna 1 and ground 2. It will be seen that by this arrangement (of which the diagram is, of course, only schematic) the radio transmission from the aircraft is so controlled, as stated above, as to indicate at a receiving station where it is received, whether or not the aircraft is in flight; what is its flying speed at the moment of observation; and how far it has flown since observation was begun.

The necessary calibration of the instruments, and coordination between the transmission system and reception system is a relatively simple matter. The observer can readily predetermine, for example, what frequency change in the transmission or modulation corresponds to a known distance; what frequency (of transmission or modulation) corresponds to the engine speed; and at what speed or under what conditions the transmitter is adjusted to be put into or out of operation.

It should be understood that the foregoing drawings are merely schematic or block diagrams illustrating the organization of the present invention and do not purport to show the mechanical and electrical details thereof. Many variations of the particular arrangements illustrated, in which transmission is controlled in order to indicate to an observing station conditions on a moving object, fall within the scope of the present invention, and are merely applications of the principles set forth above.

I claim:

1. In a radio communication system, the method of observing relations between a moving object and a fixed observation station which comprises transmitting radio signals from said moving object; varying the character of said transmission in accord with one or more characteristics of the motion of said object; receiving said transmission from said moving object at an observation station; and interpreting or analyzing said variations in the received transmission in order to determine the characteristics represented thereby.

2. In a radio communication system, the method of observing relations between a moving object and a fixed observation station which comprises generating radio frequency oscillations at said moving object; modulating said radio frequency oscillations; varying the character of the modulation thereof in accord with a predetermined characteristic of the motion of said moving object to produce signals capable of interpretation; transmitting said signals from said moving object; receiving said transmitted signals at an observation station; and interpreting said received signals to determine the characteristic of motion represented thereby.

3. Method of observing relations between an aircraft in flight and an observation station on the ground, which comprises generating radio frequency oscillations on said aircraft, producing variations thereof in accord with the distance traversed by said aircraft to form signals capable of interpretation to determine the distance traversed, transmitting said signals from said aircraft, receiving said transmitted signals at an observation station on the ground, and interpreting said received signals to determine the distance traversed by said aircraft.

4. Method of observing relations between an aircraft in flight and an observation station on the ground, which comprises generating radio frequency oscillations on said aircraft, producing variations thereof in accord with the distance traversed by said aircraft to form signals capable of interpretation to determine the distance traversed, transmitting said signals from said aircraft, receiving said transmitted signals at an observation station on the ground, and determining the distance traversed by said aircraft by comparison of the characteristics of the received signal with a predetermined standard.

5. Method of observing relations between an aircraft in flight and an observation station on the ground, which comprises generating radio frequency oscillations on said aircraft, producing variations thereof in accord with the instantaneous speed of said aircraft to form signals capable of interpretation to determine the instantaneous speed, transmitting said signals from said aircraft, receiving said transmitted signals at an observation station on the ground, and interpreting said received signals to determine the instantaneous speed of said aircraft.

6. A radio communication system for aircraft, comprising, in combination, a radio transmitting system located on an aircraft, means located on said aircraft for varying one or more characteristics of the radio transmission from said transmitting system in accord with a desired phase of the motion of said aircraft, a radio receiving system for receiving said transmission, and means at said receiving station for interpreting or analyzing said received transmission in order to determine the characteristics represented by the variations thereof.

In testimony whereof, I affix my signature.

CLINTON BLAKE TOWNSEND.

DISCLAIMER 1,801,466.—*Clinton Blake Townsend*, New York, N. Y. ELECTRICAL METHOD OF AND MEANS FOR OBSERVING OBJECTS IN MOTION. Patent dated April 21, 1931. Disclaimer filed January 11, 1935, by the *patentee*.

Hereby disclaims from the said Letters Patent of the United States, No. 1,801,466, claims numbered 1, 2, 5 and 6 thereof, constituting the counts of a certain interference in the United States Patent Office No. 67,989, as to which said claims your petitioner has signed a concession of priority to the opposing parties to the said interference, Messrs. Lawrence A. Hyland and Malcolm P. Hanson, whose application Serial No. 567,248 filed October 6, 1931, constituted the interfering application involved in the said interference.

[*Official Gazette February 5, 1935.*]